Dec. 22, 1931.  T. SHIPLEY  1,837,797
METHOD AND APPARATUS FOR CONDITIONING AIR
Filed July 16, 1928
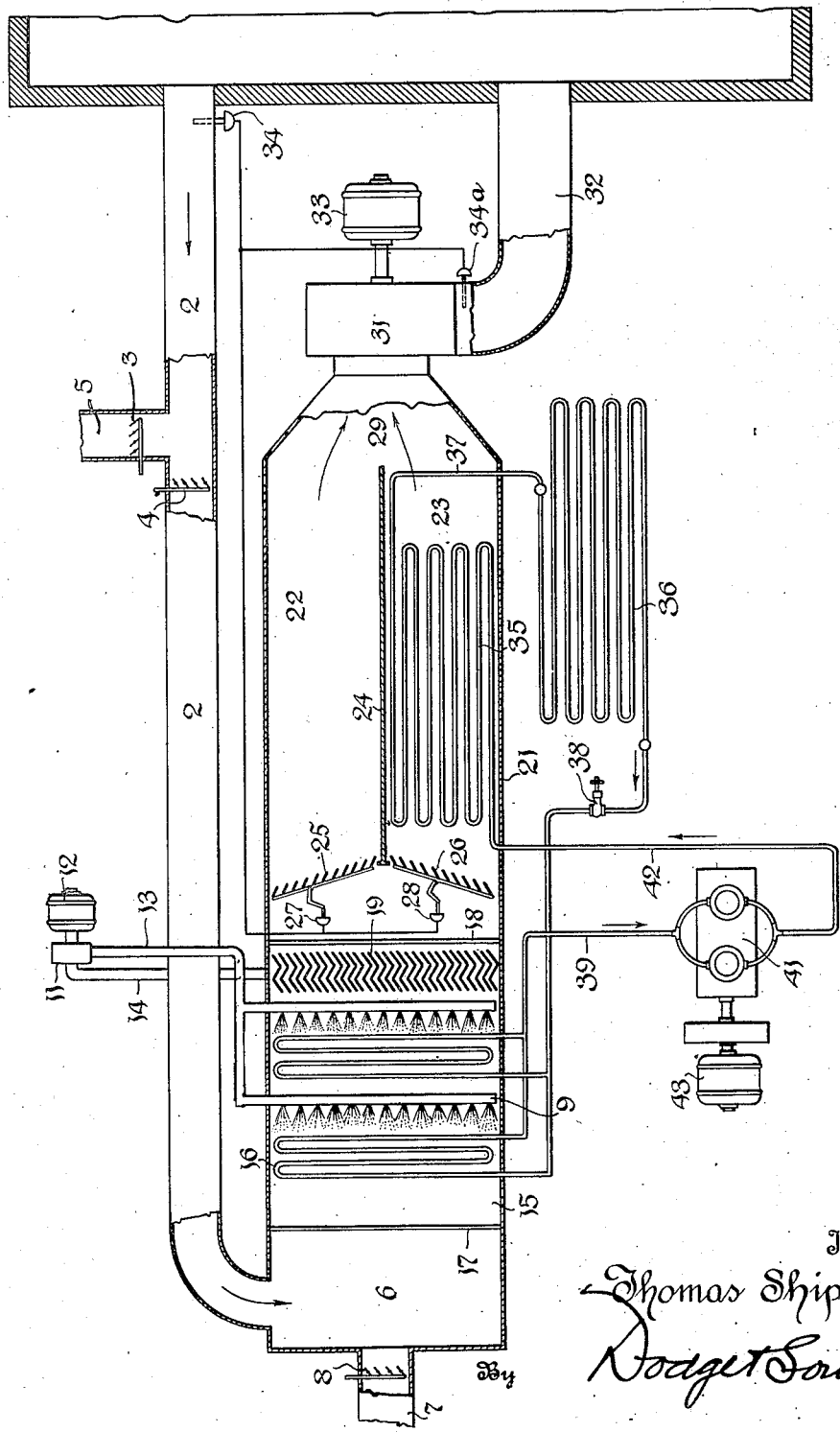
Inventor:
Thomas Shipley,
By Dodge & Sons,
Attorneys Patented Dec. 22, 1931

1,837,797

UNITED STATES PATENT OFFICE

THOMAS SHIPLEY, OF YORK, PENNSYLVANIA, ASSIGNOR TO YORK ICE MACHINERY CORPORATION, OF YORK, PENNSYLVANIA, A CORPORATION OF DELAWARE

METHOD AND APPARATUS FOR CONDITIONING AIR

Application filed July 16, 1928. Serial No. 293,072.

This invention relates to air conditioning plants for use in maintaining the desired temperature and relative humidity in enclosed spaces such as factories, theaters, and other buildings in which it is necessary to maintain air at a controlled temperature and low relative humidity.

The invention will be discussed as applied to the cooling of theaters and the like, because in this field it develops peculiar value, but its utility is by no means limited to this field.

The problem of air conditioning in a theater is primarily a refrigeration problem, throughout a large portion of the year the heat and moisture given off by the audience being sufficient to raise the temperature and relative humidity to oppressive values. Generally stated, the usual conditioning plant applied to counteract these tendencies involves a ventilating system which withdraws air from the theater, passes it through a refrigerating device to lower its temperature and thus reduce the total heat and moisture, then passes it through a reheater to increase the total heat and reduce the relative humidity, and finally discharges the air, so conditioned, back to the theater. It is generally desirable to vent a certain proportion of the circulated air, for example about 25%, and to furnish in lieu of this vented air fresh air drawn from outside. As a rule this fresh air is passed through the conditioner, together with the re-circulated air.

The usual practice is to use for the refrigerating medium an air washer in which the sprays are fed with refrigerated water. In this way not only is the relative humidity reduced, but the air is washed and purified with great advantage in the final result. In early plants of this type it was the practice to use steam coils as the reheating medium. This practice was objectionable not only because of the expense which it entailed, but also because of the trouble and annoyance incident to the operation of the heating boiler.

To obviate this difficulty, a number of plants have recently been installed in which the reheating has been effected by withdrawing air from the auditorium and mixing it with the conditioned air. In order to secure sufficient heat from the auditorium to bring about the desired reheating effect, it is necessary to circulate large volumes of air which are not conditioned or treated in any way. In fact, such volumes of untreated air commonly equal the volume of conditioned air. This entails the use of unnecessarily large fans and ducts and produces a result which is far from ideal for the reason that despite the large size of the plant used the return air is merely a mixture of conditioned air and vitiated air. Regarded from one point of view, such systems involve merely the supply to the theater of a very small quantity of purified air. The only object of withdrawing from the theater and returning to the theater a large volume of unconditioned air is to assure that this will be mixed with the conditioned air outside the theater, for if the mixture were effected in the theater serious discomfort would be occasioned by drafts of cold air and by unequal mixture of the conditioned air with the unconditioned air.

The present invention accomplishes the desired result by restoring to the air, after it has been refrigerated, heat abstracted from the circulating air by the refrigerating machine. In this way the air is passed through what might be called a partially closed thermocycle in which heat is first abstracted from the air to reduce its temperature, and consequently its total moisture, and then is restored in part to this dehumidified air to raise its temperature in a controlled degree, thus reducing its relative humidity.

In the preferred form of the invention, the heat is abstracted from the air by the refrigerated water which is sprayed into the air current and acts as a washer as well as a dehumidifier. The water is refrigerated by a mechanical refrigerating unit which rejects the heat through a pre-cooler and a condenser. The pre-cooler acts as a reheater for the air leaving the washer and thus restores to the air leaving the washer, heat units which are abstracted from the air in the washer. The pre-cooler can be regarded as a part of the condenser or as a pre-cooler attached to the condenser. In a sense it is probably inaccurate to state that its action is either strictly one or the other, because the effects are so similar that no sharp line of distinction can be drawn.

Many known means might be used to vary the total amount of heat rejected through the pre-cooler, or through that part of the condenser which is in heat exchanging relation with the washed air, but I prefer and illustrate a system in which the condenser precooler acting as an air reheater is mounted in one of two passages forming the discharge from the washer, the other passage being entirely free. These two passages are opened and closed in reversed senses by damper mechanisms which are preferably subjected to a common control. The relative proportions of the air passing through the two passages determines the final temperature of the mixture.

The damper mechanism just mentioned lends itself to thermostatic control. The thermostat may be located in the duct through which air is withdrawn from the theater, or it may be located in the duct through which conditioned air is returned to the theater, or a plurality of thermostats located at the points mentioned may be availed of to exercise conjoint control.

A system of this character is primarily intended for summer use, but where winter heating in the theater is considered necessary, it is entirely practicable to put in the circulation duct the usual preheater and reheater steam coils commonly used with air washers. This is not a feature of the invention, being common practice in the art, but the possibility of inserting such coils for winter use is mentioned merely to point out the fact that the characteristics of an installation embodying the present invention are not such as to preclude the use of such coils in cases where such use is desired.

The preferred embodiment of the invention is illustrated in the accompanying drawing which is a diagrammatic plan view of a portion of an enclosed space, together with the conditioning system in plan.

1 represents a portion of an auditorium, theater or other enclosed space in which it is desired to maintain a desired temperature and humidity. 2 represents an exhaust or air discharge duct leading from this space. I contemplate that this duct may be connected at any desired point, not excluding the familiar arrangements in which air is drawn through mushroom ventilators under seats in theaters and the like. No claim of novelty is based on any particular location for the exhaust duct, nor is any particular limitation as to its location or character implied.

3 and 4 are manually adjustable dampers, the damper 3 controlling a vent connection 5 leading to the atmosphere and the damper 4 controlling flow through the duct 2. By appropriate relative settings of the dampers 3 and 4 it is possible to vent to atmosphere a desired proportion say about one-fourth of the total air withdrawn from the space 1. The duct 2 discharges into a mixing chamber 6 to which there leads a fresh air inlet 7 controlled by a manually set damper 8. From the mixing chamber 6 air entering through the ducts 2 and 7 flows to the right through the washer which is of known form. This includes a plurality of spray pipes 9 which are fed with spray water by rotary pump 11 driven by a motor 12. The pump discharges through pipe 13 and draws water through pipe 14 from a sump or basin 15 into which the spray water flows. The water is refrigerated by evaporator or expander coils 16 of known form which are preferably mounted in the path of the air and of the spray discharged from the spray heads 9. In this way the air is refrigerated by direct contact with the coils and also by contact with the spray water which impinging upon the coils is cooled as it trickles back to the sump 15. The ends of the sump are indicated at 17 and 18. 19 is an eliminator of usual construction.

The washer is housed in an elongated duct 21 which extends beyond the eliminators 19 and which beyond these eliminators is subdivided into two passages 22 and 23 by means of a vertical partition 24. Entrance to the passage 22 is controlled by louver damper 25 and entrance to the passage 23 is controlled by a similar louver damper 26. These are connected to be operated respectively by damper motors 27 and 28 in relatively reversed senses so that as damper 25 opens the damper 26 closes and vice versa. While I show separate damper motors 27 and 28, other equivalent mechanisms for reversely operating the dampers 25 and 26 are familiar to those skilled in the art and may be substituted if desired.

The partition 24 terminates short of the end of the duct 21 forming a combining chamber 29 at the entrance eye of total volume fan 31, so that air currents discharging from the ducts 22 and 23 in varying proportions, will flow together into the total volume fan 31 in which they are intimately mixed, and by which they are discharged through the duct 32 back to the space 1. The fan 31 is driven by any suitable means, for example the motor 33.

The damper motors 27 and 28 are preferably controlled by an insertion thermostat 34 of any suitable known type. The location of the thermostat 34 is not, however, limited to that shown, and it might, for example, be located at 34a in the return duct 32. A location of the general character indicated at 34 is approximately equivalent to a location within the space 1 for it actually gives control by the air leaving the space 1 which is indicative of the average condition in the space.

Systems of control are also known in which two thermostats such as 34 and 34a exert a combined control, the thermostat 34a acting as a limiting thermostat to prevent the entering air from being too cold, while the thermostat 34 acts to effect the normal regulation. Except as expressly stated in the claims I do not desire to be limited to any particular location for the thermostat or thermostats, but contemplate availing myself of known developments in the art of temperature regulation. Manual regulation may be used. It is also practicable to apply automatic regulation to dampers 3, 4 and 8.

Mounted in the passage 23 is a coil 35 which has a dual function. It is a pre-cooler attached to the condensing coil 36 (or may be considered as a part thereof); it is also a reheater for air leaving the washer and flowing through the duct 23. The condenser 36 is ordinarily water cooled, but the cooling means being familiar in the art is not illustrated. The coils 35 and 36 are connected by the pipe 37 and are illustrated as simple trombone coils, but it must be remembered that the drawing is diagrammatic and I contemplate the use of any suitable form of heat exchanger 35 and any suitable form of condenser 36.

38 is an ordinary expansion valve controlling the expansion of liquefied refrigerant from the condenser 36 to the expander or evaporator coils 16. These coils 16 are connected by a pipe 39 with the intake of a compressor 41 of any suitable form, whose discharge or high pressure line is connected by the pipe 42 with the heat exchanger 35. The compressor 41 is driven by any suitable means, for example the electric motor 43, and together with the heat exchanger 35, condenser 36, expansion valve 38 and refrigerating coils 16, forms a known mechanical refrigerating unit.

For most purposes it is preferred to use carbon dioxide as the refrigerant, but no necessary limitation to any particular refrigerant is implied. Moreover, the refrigerant cycle may be any known cycle in which heat is abstracted at a relatively low temperature and rejected at a high temperature.

With the parts arranged as described and with the motors 12, 33 and 43 running, the fan 31 operates as a total volume fan withdrawing air through the duct 2, chamber 6, the air washer, the ducts 22 and 23 (in parallel) and the combining chamber 29, and discharging this air through the duct 32 back to the theater. Proper adjustment of the dampers 4 and 3 will insure the discharge through the passage 5 of a portion of the vitiated air, while the concurrent adjustment of the damper 8 will regulate the supply of a corresponding amount of fresh air to the chamber 6, in advance of the washer. In some cases it is entirely practicable to do away with the discharge duct 5 and the dampers 3 and 4 in which case we have a plenum system, and the necessary venting of air from the auditorium takes place through leakage around windows and doors, as well understood in the art.

The refrigerating coils 16 abstract heat directly from the passing air and also from the spray, but since the spray derives whatever heat it gives up from the air, the air may be regarded as the ultimate source of the abstracted heat.

After passing through the washer and being deprived of a portion of its total heat and consequently of a portion of its moisture, the air passes through the eliminators 19 which serve to intercept any entrained moisture in the form of drops or spray. After passing through the eliminators 19, part of the air passes through the duct 22 and part through the duct 23, the relative proportions depending on the current setting of the dampers 25 and 26, which as explained are adjusted preferably thermostatically. It is preferred to control by a single thermostat 34 which is placed in the discharge duct 2, but other arrangements as explained fall within the broad scope of the invention.

The air passing through the duct 23 is heated by heat rejected through the heat exchanger 35 i. e., the sensible heat of the compressed refrigerant. The adjustment of the dampers 25 and 26 thus controls the temperature of the air, leaving the total volume fan 31. The refrigerant partially cooled and partially condensed in the exchanger 35 flows through the pipe 37 to the condenser 36 where it is completely condensed and then allowed to expand through the valve 38 back to the refrigerating coils 16.

The method and apparatus above described present a number of important advantages in the art. In the first place all of the air which is discharged into the theater through the passage 32 has been washed and conditioned. The importance of passing all the air through the washer cannot be overestimated, for the washer is a very effective means of removing suspended dust and germs and eliminating odors. The withdrawal of air through mushrooms on the floor of the theater and its return without washing to the auditorium is an insanitary procedure. The thorough washing of the circulated air is therefore almost essential to the maintenance of healthful conditions.

Another advantage is that because all of the air is refrigerated, it is unnecessary to operate the refrigerating coils 16 at as low a temperature and pressure as is required where severe dehumidification of a small proportion of the air is necessary if the desired degree of dehumidification is to be secured at all. The use of higher suction pressures increases the volumetric efficiency of the compressor and is a desirable feature.

No extraneous source of heat is necessary for reheating the air leaving the washer, for this air is reheated by a restoration of a portion of the heat units abstracted in the washer. There is the further incidental advantage that the cold washed air acting upon the exchanger 35 assists in liquefaction, and has the effect of reducing the amount of condenser water necessarily used, or of reducing the head pressure against which the compressor 41 works. This likewise presents a substantial economy in the operation of systems of this character.

Since all the air which is circulated is washed and conditioned the total amount which need be circulated to maintain a chosen standard of air purity within the space 1 is reduced to the possible minimum. This means that the ducts and the conditioning system itself may be substantially reduced in size on the basis of the standard of purity to be maintained.

It will be observed that the refrigerating coils 16 operate at a temperature substantially below that which it is desired to maintain within the space 1 and that heat is rejected through the exchanger 35 at a temperature substantially above that which it is desired to maintain in the space 1. It will also be observed that the refrigerating unit abstracts heat in two ways, that is, directly from the air contacting with the coils 16 and indirectly from the air by way of the sprayed water. This produces a very effective action with an extremely simple washer structure.

While I prefer the system of having two ducts 22 and 23 with controlling dampers as the simplest and probably the best means for controlling the amount of heat transferred by the exchanger 35 to the air, I am aware that other means for regulating this transfer of heat are practical and may be adopted, and in its broader aspects the present invention is not limited to any particular regulating means. In fact, all that is essential is that there be provided some means for regulating the amount of heat rejected on the high pressure side of the refrigerating cycle and imparted to the air. In considerable degree, the nature of the refrigerating cycle and the refrigerant used will control the form and arrangement of the combined condenser (or condenser precooler) and air reheater.

What is claimed is:

1. The method of conditioning air in an enclosed space, which consists in withdrawing air from such space; cooling said air by a reversed heat cycle to reduce its absolute moisture; partially reheating said air by heat rejected by the reversed heat cycle; and returning said air to the enclosed space.

2. The method of conditioning air in an enclosed space, which consists in withdrawing air from such space; mechanically refrigerating water; washing such air with the mechanically refrigerated water to cleanse and dehumidify the same; heating such air after washing by imparting to it a part of the heat units abstracted from the water and rejected by the mechanical refrigeration step; and returning said air to the enclosed space.

3. The method of conditioning the air in an enclosed space, which comprises establishing a ventilating circuit from and back to said space, inducing a circulation therethrough, and subjecting the air when flowing in said circuit to a pronounced temperature reduction followed by partial restoration of total heat, by a mechanically sustained reversed heat cycle acting to abstract heat at one point of the circuit, restore a part at a later point in the circuit and reject the remainder.

4. The method of conditioning the air in an enclosed space, which comprises establishing a ventilating circuit from and back to said space, inducing a circulation therethrough, subjecting the air when flowing in said circuit to a pronounced temperature reduction followed by partial restoration of total heat, by a mechanically sustained reversed heat cycle acting to abstract heat at one point of the circuit, restore a part at a later point in the circuit and reject the remainder, and varying the relative proportions of heat so restored and rejected to control the temperature of the conditioned air returned to the space.

5. The method of conditioning the air in an enclosed space, which comprises establishing a ventilating circuit from and back to said space, inducing a circulation therethrough, subjecting the air when flowing in said circuit to a pronounced temperature reduction followed by partial restoration of total heat, by a mechanically sustained reversed heat cycle acting to abstract heat at one point of the circuit, restore a part at a later point in the circuit and reject the remainder, and controlling the proportions of heat so restored and rejected in response to the temperature of the conditioned air returned to the space.

6. The method of conditioning air in an enclosed space, which consists in mechanically refrigerating water to a temperature below and rejecting the abstracted heat at a temperature above the temperature desired in said space; establishing a ventilating circuit leading from and back to said space; and in said circuit first washing the circulating air with the refrigerated water, then reheating a part of the washed air with a portion of said rejected heat and then mixing said reheated air with the remainder of the washed air.

7. The method of conditioning air in an enclosed space, which consists in mechanically refrigerating water to a temperature below and rejecting the abstracted heat at a temperature above the temperature desired in said space; establishing a ventilating circuit leading from and back to said space; in said circuit first washing the circulating air with the refrigerated water, then reheating a part of the washed air with a portion of said rejected heat and then mixing said reheated air with the remainder of the washed air; and controlling the proportions of said mixture to establish a substantially constant temperature of the air returning to the enclosed space.

8. The method of conditioning air in an enclosed space which consists in mechanically refrigerating water to a temperature below and rejecting the abstracted heat at a temperature above the temperature desired in said space; establishing a ventilating circuit leading from and back to said space; in said circuit first washing the circulating air with the refrigerated water, then reheating a part of the washed air with a portion of said rejected heat and then mixing said reheated air with the remainder of the washed air; and controlling the proportions of said mixture in response to the temperature of the mixture.

9. The method of conditioning air in an enclosed space which consists in mechanically refrigerating water to a temperature below and rejecting the abstracted heat at a temperature above the temperature desired in said space; establishing a ventilating circuit leading from and back to said space; and in said circuit first washing the circulating air with the refrigerated water and then partially reheating it by imparting a portion of said rejected heat.

10. The method of conditioning air in an enclosed space which consists in mechanically refrigerating water to a temperature below and rejecting the abstracted heat at a temperature above the temperature desired in said space; establishing a ventilating circuit leading from and back to said space; in said circuit first washing the circulating air with the refrigerated water and then partially reheating it by imparting a portion of said rejected heat; and regulating said reheating to maintain a substantially constant temperature of the air returning to the enclosed space.

11. The method of conditioning air in an enclosed space which consists in mechanically refrigerating water to a temperature below and rejecting the abstracted heat at a temperature above the temperature desired in said space; establishing a ventilating circuit leading from and back to said space; in said circuit first washing the circulating air with the refrigerated water and then partially reheating it by imparting a portion of said rejected heat; and simultaneously admitting fresh air to and venting vitiated air from said space at rates less than said circulatory rate.

12. The method of conditioning air in an enclosed space which consists in mechanically refrigerating water to a temperature below and rejecting the abstracted heat at a temperature above the temperature desired in said space; establishing a ventilating circuit leading from and back to said space; in said circuit first washing the circulating air with the refrigerated water and then partially reheating it by imparting a portion of said rejected heat; simultaneously feeding fresh air to said circuit at a rate materially less than said circulatory rate and in advance of the washing step; and venting at a corresponding rate, vitiated air from said space.

13. The combination of a room; a ventilating duct leading from and back to said room; and means for inducing a circulation through said duct; a dehumidifier unit of the refrigerating type including an evaporating cooling coil and a heat rejecting condenser, said coil and a portion only of the condenser being in said duct in the order stated relatively to the direction of circulatory flow; and means for directing the circulating air after cooling by the cooling coil, in a variable degree into heat exchanging relation with that portion of the condenser which is within the duct.

14. The combination of a room; a ventilating duct leading from and back to said room; means for inducing a circulation through said duct; a dehumidifier unit of the refrigerating type including an evaporator cooling coil and a heat rejecting condenser, said coil and a portion only of the condenser being in said duct in the order stated relatively to the direction of circulatory flow; means for directing the circulating air after cooling by the cooling coil, in a variable degree into heat exchanging relation with that portion of the condenser which is within the duct; and thermostatic means controlling the last named means.

15. The combination of a room; a ventilating duct leading from and back to said room; means for inducing a circulation through said duct; an air washer interposed in said duct; means for feeding water to said washer; refrigerating means for cooling said water and including a condenser associated with said duct; and means for directing the air flowing in the duct from said washer in greater or less degree into heat exchanging relation with said condenser.

16. The combination of a room; a ventilating duct leading from and back to said room; means for inducing a circulation through said duct; an air washer interposed in said duct; means for feeding water to said washer; refrigerating means for cooling said water and including a condenser located at least in part in said duct; means affording two paths in said duct beyond said washer, one of which conducts the circulated air in heat exchanging relation with the condenser; and damper means for variably dividing the flow of air in said duct between said two paths.

17. The combination of a room; a ventilating duct leading from and back to said room; means for inducing a circulation through said duct; an air washer interposed in said duct; means for feeding water to said washer; refrigerating means for cooling said water and including a condenser located in part in said duct; means affording two paths in said duct beyond said washer, one of which conducts the circulated air in heat exchanging relation with that part of the condenser which is in said duct; damper means for variably dividing the flow of air in said duct between said two paths; and thermostatic means for actuating said damper means.

18. The combination of a room; a ventilating duct leading from and back to said room; means for inducing an air circulation through said duct; an air washer interposed in said duct; means for feeding water to said washer; refrigerating means for cooling said water and including a condenser having a precooler portion in said duct beyond said washer and a main condensing portion outside said duct; and means for varying the amount of heat dissipated by said precooler portion.

19. The combination of a room; a ventilating duct leading from and back to said room; means for inducing an air circulation through said duct; an air washer interposed in said duct; means for feeding water to said washer; refrigerating means for cooling said water and including a condenser having a precooler portion in said duct beyond said washer and a main condensing portion outside said duct; means affording two paths in said duct beyond said washer, one of which conducts the circulated air in heat exchanging relation with said precooler portion; and damper means for variably dividing the flow of air in said duct between said two paths.

In testimony whereof I have signed my name to this specification.

THOMAS SHIPLEY.